3,364,166
POLYCARBOXYLIC AROMATIC IMIDE ENAMELS
Robert W. Barito, Schenectady, N.Y., assignor to General Electric Company, a corporation of New York
No Drawing. Filed June 30, 1964, Ser. No. 379,352
10 Claims. (Cl. 260—30.2)

ABSTRACT OF THE DISCLOSURE

High boiling petroleum hydrocarbon fractions containing alkyl benzenes are added to polyimide wire enamels as an additional solvent to improve flowability, smoothness, corner coverage and dielectric breakdown.

---

This invention relates to improved electrical insulating enamels and to electrical conductors coated therewith. More particularly, it relates to such compositions which afford smoother coatings on wires and give better insulating coverage particularly on wires or conductors which have edges or corners such as occur in rectangular or noncircular cross-sectional electrical conductors.

With the increasing use of electrical equipment at elevated temperatures, there has arisen a requirement for insulating compositions or enamels and conductors insulated with such materials which will withstand higher and higher temperatures, at the same time being capable of withstanding the physical and mechanical abuses to which such conductors are subjected in normal usage. Among the materials which have been found to be very useful for high temperature electrical insulating purposes are the so-called "polyimide" materials having the recurring unit

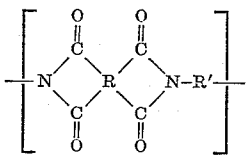

where R is a tetravalent radical containing at least six carbon atoms in a ring having benzenoid unsaturation, the four carbonyl groups being attached to separate carbon atoms in the ring, each pair of carbonyl groups being attached to adjacent carbon atoms in the R radical and wherein R' is a divalent benzenoid radical of the formula

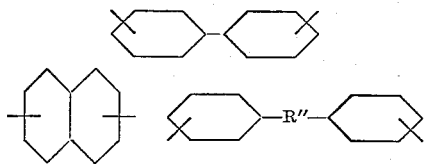

in which R" is carbon, oxygen, silicon or sulfur. Such materials, capable of withstanding elevated temperatures, are described in British patent specification 903,271 published Aug. 15, 1962, this disclosure being incorporated by reference herein.

Among the specific polyimides of the above type which have found commercial usage are the so-called "polyaromatic polycarboxylic aromatic imide" or polypyromellitimide manufactured by Du Pont as "ML." This material is prepared by reacting pyromellitic dianhydride and the aromatic diamine, oxydianiline to produce a polyamide acid which, upon heating, results in a polyimide group containing material possessed by extremely good thermal resistance and good electrical qualities. This material can be expressed by the formula

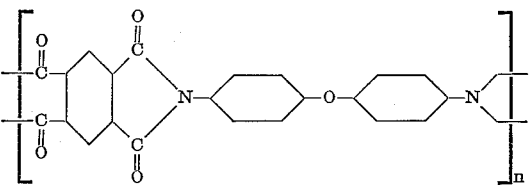

where $n$ is a number more than one.

Generally speaking, the polyimide forming enamels are prepared by combining with the uncured polyamide acid material a suitable solvent, the wire or conductor to be coated being passed through a bath of the enamel and then through dies, after which the polyimide coating on the wire is produced by heating. Repeated coats are applied to obtain the desired insulating build or thickness. While such enamels form the polyimide only upon heating, they are normally known as polyimide enamels both in their uncured and cured state. While such polyimide enamels are useful as wire coatings in many applications, it has been found that they are wanting in the smoothness of the coating which they afford or their flow-out ability or capability of flowing out to a smooth surface. It has also been found that particularly when rectangular electrical conductors are employed, the coverage of such enamels on the corners or edges of the wires leaves much to be desired. The poor flow-out of the enamel, as pointed out above, results in a rough surface which is unattractive and can serve as incipient points for mechanical and electrical failure. The poor corner coverage results in low dielectric breakdown under voltage stress and drastically limits the application of conductors so coated in electrical equipment.

From the above, it will be seen that there is a need for improved electrical insulating enamels of the type described which will provide better flow-out and better corner coverage or coverage on conductors having edges, and it is a primary purpose of this invention to provide such materials.

Briefly, the invention relates to compositions in which polyimide enamel is modified by adding thereto from about 5 to 25% of high boiling petroleum hydrocarbon fractions known as alkyl benzenes.

Those features of the invention which are believed to be novel are set forth with particularity in the claims appended hereto. However, further objects and advantages of the invention will be appreciated from a consideration of the following description.

The polyimide enamels used in conjunction with the present invention are generally those of the type described above. Such enamels include varying amounts of solvents such as N-methylpyrrolidone or N-methylpyrrolidone and dimethyl acetamide, or other equivalent materials which are well known to those skilled in the art, the final enamel having generally from about 15 to 20% by weight of solids.

The high boiling petroleum hydrocarbon fractions or alkyl benzenes used in connection with the invention are well known. Typical of such materials are "Solvesso" 100, a product of the Standard Oil Company of New Jersey, which is a mixture of mono-, di- and tri-alkyl (primarily methyl) benzenes having a flash point of about 113° F. and a distillation range of about 318° F. to 352° F. Another such material, "Solvesso" 150, is a mixture of di-, tri- and tetra-alkyl (primarily methyl) benzenes having a flash point of about 151° F. and a distillation range of from about 364° F. to 412° F.

The examples shown in the table below illustrate the practice of the invention and are not to be taken as limiting in any way. The polyimide enamel used in Examples 1, 3, 4, 5 and 6 was Du Pont "ML" enamel having a polyimide base and a solvent consisting essentially of N-methylpyrrolidone to give a solids content of from about 15 to 20% by weight. The polyimide based enamel of Example 2 was a Du Pont "ML" enamel having as a solvent essentially N-methylpyrrolidone and dimethyl acetamide having a solids content similar to that above. Examples 3 through 6 illustrate the practice of the present invention wherein varying amounts of high boiling petroleum hydrocarbon fractions or alkyl benzenes are added to the "ML" enamel of Example 1. All parts are by weight. Generally, improved results are obtained when from about 5 to 25% by weight of the alkyl benzenes based on the weight of the enamel are added.

In carrying out the examples, a rectangular wire having a cross section 0.190 inch x 0.085 inch was passed through the enamel solution, then through stainless steel dies and into a wire curing tower having a bottom temperature of 200° C. and a top temperature of 400° C. at a speed of about 8 feet per minute. Repeated passes were made through the enamel and oven to provide a cured enamel build of from about 2 mils to 4 mils on the edges and from about 3 mils to 4 mils on the flat surfaces. All wire so coated was examined for build, dielectric breakdown, flexibility, adherence and visual appearance, both for roughness and die marks as well as for corner coverage, the latter being carried out at 15× magnification.

In testing for dielectric breakdown, aluminum foil was wrapped tightly about the enamel conductor and an electrical potential placed across the conductor and foil, the voltage being increased at a rate of 250 volts/second until a finite current flows through the insulation, the voltage at current flow being the breakdown voltage.

In testing for flexibility, a sample of the enamel wire was elongated 30% and the enamel coating visually checked for cracking. In testing for an adherence, an enameled wire was stretched 30% and the insulation checked for evidence of tubing or separation from the conductor.

whereas those having the present additives gave good flow-out with smooth coatings and good corner coverage.

There are provided, then, by the present invention improved polyimide based electrical insulating enamels which provide smooth coatings, good corner coverage and good dielectric breakdown by reason of the addition thereto of alkyl benzene materials.

What I claim as new and desire to secure by Letters Patent of the United States is:

1. An electrical insulating composition containing 15 to 20% by weight of solids and having therein the recurring unit

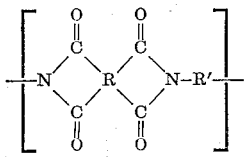

where R is a tetravalent radical containing at least six carbon atoms in a ring having benzenoid unsaturation, the four carbonyl groups being attached to separate carbon atoms in the ring, each pair of carbonyl groups being attached to adjacent carbon atoms in the R radical, and wherein R' is a divalent benzenoid radical selected from the group consisting of

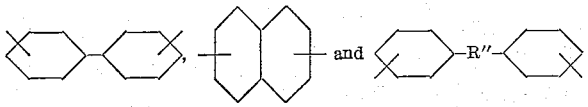

in which R" is selected from the group consisting of carbon, oxygen, silicon and sulfur, the remainder of said composition consisting essentially of solvent selected from N-methylpyrrolidone and a mixture of N-methylpyrrolidone and dimethyl acetamide, there being added to said material from about 5 to 25% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

2. A wire coating composition comprising a polycarboxylic aromatic imide enamel having a solids content of from about 15 to 20% by weight, the remainder of said composition consisting essentially of solvent selected from N-methylpyrrolidone and a mixture of N-methylpyrrolidone and dimethyl acetamide, said composition having added thereto from about 5 to 25% by weight of alkyl benzenes selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

3. A wire coating composition comprising a polycarboxylic aromatic imide enamel having a solids content of from about 15 to 20% by weight, the remainder of said composition consisting essentially of solvent selected

| Example | Percent by Weight | | | Enamel viscosity at 26° C. (cps.) | Surface Tension at 26° C. (dynes/cm.) | Dielectric Breakdown (volts) | Appearance |
|---|---|---|---|---|---|---|---|
| | Enamel | Solvesso 100 | Solvesso 150 | | | | |
| 1 | 100 | | | 5,340 | 45.90 | 1,074 | Die marks left due to poor flow-out of the enamel. Poor corner coverage. |
| 2 | 100 | | | 5,290 | 43.80 | 1,635 | Do. |
| 3 | 100 | 10 | | 2,750 | 41.0 | 2,740 | Die marks left due to poor flow-out of the enamel. Fair corner coverage. |
| 4 | 100 | 15 | | 2,125 | 39.0 | 3,560 | Do. |
| 5 | 100 | 20 | | 1,700 | 38.5 | 5,710 | Smooth and free of die marks. Fair to good corner coverage. |
| 6 | 100 | 10 | 10 | 1,456 | 35.47 | 7,005 | Smooth and free of die marks. Good corner coverage. |

All wires enameled according to the above examples passed the above flexibility and adherence tests. It will be noted, however, that when the polyimide enamel was used alone as in Examples 1 and 2, the dielectric breakdown strength which in all examples was the average of four tests was relatively low ranging from 1074 volts for Example 1 to 1635 volts for Example 2. With the addition of the alkyl benzenes to the enamel, the flow-out improved substantially along with good corner coverage. The dielectric breakdown also improved substantially ranging from 2740 volts for Example 3 to an average dielectric breakdown of 7005 volts for Example 6 which constitutes a substantial and most unexpected improvement over the polyimide enamels not treated according to the present invention. It will also be noted that the polyimide based enamels used as such and without the improvement of the present invention exhibited poor flow-out, resulting in die marks and poor corner coverage, the latter contributing to the low dielectric breakdown, from N-methylpyrrolidone and a mixture of N-methylpyrrolidone and dimethyl acetamide, said enamel having added thereto from about 5 to 25% by weight of high boiling petroleum hydrocarbon fractions selected from a mixture of mono-, di- and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

4. A wire coating composition comprising a polycarboxylic aromatic imide enamel having a solids content of from about 15 to 20% by weight, the remainder of said composition consisting esesntially of solvent selected from N-methylpyrrolidone and a mixture of N-methylpyrrolidone and dimethyl acetamide, said enamel having added thereto about 10% by weight of high boiling petroleum hydrocarbon fractions selected from a mixture of mono-, di- and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

5. A wire coating composition comprising a polycarboxylic aromatic imide enamel having a solids content of from about 15 to 20% by weight, the remainder of said composition consisting essentially of solvent selected from N-methylpyrrolidone and a mixture of N-methylpyrrolidone and dimethyl acetamide, said enamel having added thereto about 15% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

6. A wire coating composition comprising a polycarboxylic aromatic imide enamel having a solids content of from about 15 to 20% by weight, the remainder of said composition consisting essentially of solvent selected from N-methylpyrrolidone and a mixture of N-methylpyrrolidone and dimethyl acetamide, said enamel having added thereto about 20% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

7. A wire coating composition comprising polypyromellitimide enamel having a solids content of from about 15 to 20% by weight, t he remainder of said composition consisting essentially of solvent selected from N-methylpyrrolidone and a mixture of N-methylpyrrolidone and dimethyl acetamide, said composition having added thereto from about 5 to 25% by weight of alkyl benzenes selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

8. A wire coating composition comprising a polypyromellitimide enamel having a solids content of from about 15 to 20% by weight, the remainder of said composition consisting essentially of solvent selected from N-methylpyrrolidone and a mixture of N-methylpyrrolidone and dimethyl acetamide, said composition having added thereto about 10% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

9. A wire coating composition comprising a polypyromellitimide enamel having a solids content of from about 15 to 20% by weight, the remainder of said composition consisting essentially of solvent selected from N-methylpyrrolidone and a mixture of N-methylpyrrolidone and dimethyl acetamide, said composition having added thereto about 15% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

10. A wire coating composition comprising a polypyromellitimide enamel having a solids content of from about 15 to 20% by weight, the remainder of said composition consisting essentially of solvent selected from N-methylpyrrolidone and a mixture of N-methylpyrrolidone and dimethyl acetamide, said composition having added thereto about 20% by weight of high boiling petroleum hydrocarbon fractions selected from a mixture of mono-, di-, and tri-alkyl benzenes having a distillation range of about 318° F. to 352° F. and a flash point of about 113° F. and a mixture of di-, tri-, and tetra-alkyl benzenes having a distillation range of about 364° F. to 412° F. and a flash point of about 151° F. and mixtures thereof.

References Cited
FOREIGN PATENTS
903,271  9/1962  Great Britain.

OTHER REFERENCES
Mellan: Handbook of Solvents, vol. 1, Pure Hydrocarbons, Reinhold Publishing Corp., 1957, pp. 198–199 relied on, TP 247.5 M45h.

MORRIS LIEBMAN, *Primary Examiner.*

S. L. FOX, *Assistant Examiner.*